United States Patent
Kumazawa et al.

(10) Patent No.: US 10,439,191 B2
(45) Date of Patent: Oct. 8, 2019

(54) WELDED METAL COMPONENT AND BATTERY INCLUDING THE SAME

(71) Applicant: Panasonic Intellectual Property Management Co., Ltd., Osaka (JP)

(72) Inventors: Seiji Kumazawa, Osaka (JP); Takayuki Ashida, Osaka (JP); Shinya Mori, Hyogo (JP); Hiroaki Takano, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 211 days.

(21) Appl. No.: 15/642,866

(22) Filed: Jul. 6, 2017

(65) Prior Publication Data

US 2018/0026252 A1 Jan. 25, 2018

(30) Foreign Application Priority Data

Jul. 21, 2016 (JP) .................... 2016-143425

(51) Int. Cl.
*H01M 2/20* (2006.01)
*H01M 2/02* (2006.01)
(Continued)

(52) U.S. Cl.
CPC .......... *H01M 2/206* (2013.01); *B23K 9/232* (2013.01); *B23K 11/20* (2013.01); *B23K 26/244* (2015.10);
(Continued)

(58) Field of Classification Search
CPC .......... H01M 2/20; H01M 2/02; H01M 2/12
See application file for complete search history.

(56) References Cited

U.S. PATENT DOCUMENTS

2003/0170535 A1* 9/2003 Watanabe ........... H01M 2/0207
429/158
2009/0223940 A1 9/2009 Hosoya
(Continued)

FOREIGN PATENT DOCUMENTS

EP 2684637 A1 1/2014
JP 2003-145278 A 5/2003
(Continued)

OTHER PUBLICATIONS

Communication pursuant to Article 94(3) EPC dated Aug. 9, 2019 for the related European Patent Application No. 17 180 635.9.

*Primary Examiner* — Kenneth J Douyette
(74) *Attorney, Agent, or Firm* — Panasonic IP Management; Kerry S. Culpepper (57) ABSTRACT

A welded metal component, includes: a first component; a second component that is stacked on the first component and that is made of a material different from the first component; and at least one welded part that passes through the second component so as to reach the first component, wherein a proportion of an intermetallic compound present in the at least one welded part is from 15% to 60%, and the intermetallic compound includes a metal element that constitutes the first component, and a metal element that constitutes the second component. Further disclosed is a battery comprising the above welded metal component, wherein the second component serves as a bus bar, and the first component serves as an electrode for the battery.

9 Claims, 9 Drawing Sheets (51) Int. Cl.

| | |
|---|---|
| *C22C 9/01* | (2006.01) |
| *B23K 26/282* | (2014.01) |
| *B23K 26/323* | (2014.01) |
| *B23K 9/23* | (2006.01) |
| *B23K 35/28* | (2006.01) |
| *B23K 35/30* | (2006.01) |
| *B23K 11/20* | (2006.01) |
| *B23K 35/02* | (2006.01) |
| *B32B 15/01* | (2006.01) |
| *B23K 26/244* | (2014.01) |
| *B23K 101/36* | (2006.01) |
| *B23K 103/18* | (2006.01) |

(52) U.S. Cl.
CPC .......... *B23K 26/282* (2015.10); *B23K 26/323* (2015.10); *B23K 35/0255* (2013.01); *B23K 35/286* (2013.01); *B23K 35/302* (2013.01); *B32B 15/017* (2013.01); *C22C 9/01* (2013.01); *B23K 2101/36* (2018.08); *B23K 2203/18* (2013.01); *H01M 2220/20* (2013.01)

(56) References Cited

U.S. PATENT DOCUMENTS

| | | | |
|---|---|---|---|
| 2011/0159353 A1* | 6/2011 | Byun | .................... H01M 2/206 429/160 |
| 2016/0031042 A1 | 2/2016 | Gietzelt et al. | |
| 2016/0114429 A1* | 4/2016 | Shioga | ................. B23K 26/323 219/121.66 |

FOREIGN PATENT DOCUMENTS

| | | |
|---|---|---|
| JP | 2012-125829 A | 7/2012 |
| JP | 2012-138306 | 7/2012 |
| JP | 2015-011807 A | 1/2015 |
| JP | 2015-211981 A | 11/2015 |
| KR | 10-2016-0047348 A | 5/2016 |
| WO | 2006/016441 | 2/2006 |
| WO | 2012/164839 A1 | 12/2012 |
| WO | 2015-159503 A1 * | 10/2015 |

\* cited by examiner

FIG. 1

| Embodiments | Shapes of welded parts | Number of welded parts | Number of laser trajectories | Laser-moving rates (mm/s) | Laser output (W) | Spot diameter (μm) | Corresponding figures | Example/Comparative Examples | Detachment strength (N) | | | Mean values of detachment strengths | Acceptance | Proportions of areas of intermetallic compounds (%) | | | Mean values of proportions of areas of intermetallic compounds (%) |
|---|---|---|---|---|---|---|---|---|---|---|---|---|---|---|---|---|---|
| First embodiment | Linear | 1 | 4 | 500 | 800 | 50 | | Comparative example 1 | 63 | 29 | 38 | 43 | Inferior | 12 | 8 | 11 | 10 |
| | | | | | 1200 | | | Example 1 | 129 | 154 | 116 | 133 | Superior | 22 | 34 | 45 | 34 |
| | | | | | 1800 | | | Example 2 | 142 | 75 | 108 | 108 | Superior | 45 | 71 | 60 | 59 |
| | | | | 100 | 1200 | | FIG. 2A | Comparative example 2 | 78 | 56 | 40 | 58 | Inferior | 63 | 70 | 81 | 71 |
| | | | | 300 | | | | Comparative example 3 | 33 | 52 | 45 | 43 | Inferior | 84 | 78 | 86 | 83 |
| | | | | (500→100) × 2 sets | 1200 | | | Example 3 | 133 | 127 | 107 | 122 | Superior | 43 | 56 | 60 | 53 |
| | | | | 100 | 3500 | 200 | | Comparative example 4 | 28 | 36 | 25 | 30 | Inferior | 87 | 88 | 80 | 85 |
| | | | | 500 (for 2 lines) and 100 (for 2 lines) | 1200 | 50 | | Comparative example 5 | 55 | 83 | 84 | 74 | inferior | 67 | 70 | 66 | 68 |
| | Linear | 2 | 4+4 | 500 | 1200 | | FIG. 8 | Example 4 | 173 | 182 | 184 | 151 | Superior | 22 | 40 | 20 | 29 |
| | | | | | | | | | 133 | 124 | 111 | | | 15 | 19 | 14 | |
| | | | | | | | | | 166 | 135 | 148 | | | 38 | 46 | 48 | |
| Second embodiment | Concentric | 1 | 4 laps | 500 | 1200 | | FIG. 9 | Example 5 | 195 | 188 | 180 | 188 | Superior | 34 | 29 | 30 | 31 |
| | | | | | 1800 | | | Example 6 | 130 | 108 | 115 | 118 | Superior | 24 | 18 | 16 | 19 |
| | Linear | 1 | 8 | 500 | 1200 | | FIG. 2A | Example 7 | 152 | 137 | 152 | 147 | Superior | 25 | 24 | 21 | 23 |
| | | | | | 1800 | | | Example 8 | 153 | 137 | 128 | 139 | Superior | 45 | 63 | 60 | 56 |

WELDED METAL COMPONENT AND BATTERY INCLUDING THE SAME

TECHNICAL FIELD

The technical field relates to a welded metal component, and a battery including the same.

BACKGROUND

Battery systems that include battery cells connected in series can output high voltage. Furthermore, battery systems that include battery cells connected in parallel can secure high charge-discharge current.

For example, in high-current and high-output battery systems that have been used as power supplies for motors driving vehicles, multiple battery cells are connected in series in order to secure high voltage output. In the batteries systems used for that purpose, the multiple battery cells are connected with bus bars of metal plates. The bus bars are connected to electrode terminals of the battery cells, which form the battery systems, by way of laser welding. To form such connection structures, cut parts are formed in the bas bars, the electrode terminals of the battery cells are inserted into the cut parts, boundary regions between the inserted electrode terminals and the bus bars are irradiated with laser beams, and thus, the electrode terminals and the bus bars are joined to one another based on melting of the boundary regions.

Positive electrodes and negative electrodes are provided in the batteries, and, conventionally, aluminum terminals have been used on the positive-electrode sides, while nickel-plated copper terminals have been used on the negative-electrode sides. The electrodes of adjacent battery cells are inserted into the respective cut parts of the bus bars, and thus, the adjacent battery cells are connected with each other in series or in parallel. That is, electrode terminals of at least two battery cells are connected to one bus bar.

When combined components of aluminum and copper that are called as clad materials are used for the bus bars, the aluminum terminals on the positive-electrode sides should be welded onto the aluminum sides of the clad materials, and the copper terminals on the negative-electrode sides should be welded onto the copper sides of the clad materials. Since homogenous metal materials are welded onto one another in this case, there are not any particular technical difficulties.

However, the clad materials are formed by stacking thin aluminum plates and thin copper plates in such a manner that their joint parts come into contact with each other, followed by joining the aluminum and copper plates together based on pressure bonding simultaneously with application of heat thereto. Therefore, costs required for the step will be high, and also, materials required therefor will be expensive. Thus, there is a problem that it is impossible to reduce the costs.

In order to cope with such a situation, by using aluminum, which is an inexpensive material, for bus bars, it becomes possible to produce inexpensive and lightweight battery systems. However, when aluminum bus bars are employed, it would be very difficult to stably realize high-quality welding on the negative-electrode sides since heterogeneous materials, i.e., aluminum bus bars and nickel-plated copper terminals, need to be welded, although there would be no problem on the positive-electrode sides since homogeneous materials, i.e., aluminum bus bars and aluminum terminals, need to be welded.

In such a heterogeneous-material welding process, different types of metal materials are caused to melt and mix together, and then, are caused to solidify to thereby complete the welding process. However, in cases of heterogenous-material welding of aluminum and copper, intermetallic compounds including aluminum elements and copper elements at constant ratios will be formed if their alloys are sufficiently heated, and are fused for a certain period of time above a certain temperature. The intermetallic compounds refer to compounds (alloys) that are formed by two or more types of metals. Atom ratios of the constituent elements are expressed by integers. The compounds often have distinctive physical/chemical properties, and crystal structures that are different from those of the constituent elements.

Hereinafter, intermetallic compounds will be described in brief. Intermetallic compounds are compound formed of two or more types of metals, and are one type of alloy. Alloys are generally classified into solid solutions and intermetallic compounds.

Solid solutions are alloys in which two or more elements (that may be metal or non-metal elements) are combined with one another, thereby forming a homogenous solid phase as a whole. In solid solutions, while a structure of one of the metal elements is retained, atoms of the one of the metal are randomly substituted with the other metal element(s), or the other metal element(s) penetrates into the structure. Their compositions vary within a certain range. The properties would be similar to those of the original metals. In cases of solid solutions of aluminum and copper, the solid solutions would be softer, and have ductibility, compared with their intermetallic compounds.

On the other hand, intermetallic compounds have crystal structures that are completely different from those of the original metals. As a result, a given number of metal atoms are located at given positions, and thus, intermetallic compounds have compositions with simple integer ratios. Their properties are different from those of the original metals. In cases of intermetallic compounds of aluminum and copper, there are mainly $CuAl_2$, $CuAl$, and $Cu_9Al_4$, and they have hard and fragile properties, compared with solid solutions.

If, in heterogenous-material welding processes in which aluminum and copper materials are stacked and in which laser beams are applied onto aluminum sides of the stacked materials, large amounts of intermetallic compounds are produced in the joint areas, a small degree of detachment would be caused in boundary faces of hard and fragile intermetallic compounds when stress due to tension or the like is caused. As a result, such detachment would be broadened, and thus, the entire joint face would be stripped off even due to small stress. Therefore, there has been a problem that the above heterogenous-material welding process cannot be employed for joining components that will be subjected to stress.

With regard to a technique for improving joint strength in butt heterogenous-material welding, a joint material, including: a first metal component including Al, and less than 5.7 wt % of Cu; a second metal component including Cu, and less than 9.4 wt % of Al; and a joint part that joins the first metal component and the second metal component, wherein the joint part includes at least one element selected from the group consisting of Si, Ni, Mn, Co, Zn, Ge, Au, Ag and Pd has been disclosed in JP-A-2012-138306.

According to JP-A-2012-138306, the content of Al in the first metal component is adjusted to preferably 99.5 wt % or more in order to obtain excellent electrical conductivity besides high joint strength. Such a first metal component only includes 0.5 wt % or less of inevitable impurities, and can realize an electric conductivity of 60% IACS (an international standard for electric resistance) or even higher. As examples of such a first metal component, aluminum alloys 1050, 1080, 1100 (JIS), etc. can be mentioned. Furthermore, the content of Cu in the second metal component is preferably adjusted to 99.9 wt % or more. Such a second metal component only includes 0.1 wt % or less of inevitable impurities, and can realize an electric conductivity of about 90% IACS. As an example of such a second metal component, oxygen-free copper can be mentioned.

The joint part includes at least one "joint element" selected from the group consisting of Si, Ni, Mn, Co, Zn, Ge, Au, Ag and Pd. In the joint material having such a composition, reactivity between Al and the at least one joint element selected therefrom is higher than reactivity between Al and Cu. Additionally, reactivity between Cu and at least one joint element selected therefrom is higher than reactivity between Cu and Al. That is, Al and Cu react more preferentially with the at least one joint element, rather than reacting with each other, in cases where Al, Cu, and the at least one joint element coexist.

Accordingly, by employing such a joint part including the joint element(s), the first metal component and the second metal component can rigidly be joined through the joint part while a reaction between Al and Cu is suppressed. The conventional art describes that, as a result, a highly-reliable joint material can be obtained.

Furthermore, a method for welding thin heterogenous-metal plates, including: irradiating a side of a first thin metal plate having a relatively-low melting point, with an energy beam, to form spot-like welded parts, has been disclosed in WO2006/016441.

According to WO2006/016441, a cross-section of one welded part is wedge-shaped so as to taper toward a direction from the upper positive-electrode terminal to the lower negative-electrode terminal. Within the welded part, at least a penetration part and an adjacent part thereof are made of an alloy. Within the stacked area, the total area (total amount) of the welded part itself is small. Therefore, any increase in the electric resistance due to the alloyed welded part is reduced, and thus, the stacked area exhibits favorable electric properties.

Furthermore, intermediate regions in which positive terminals and negative terminals are in direct contact with each other are formed between adjacent welded parts, and therefore, an electric current can be caused to flow through the intermediate regions having reduced electric resistance. Accordingly, preferable electric properties can be retained. In the intermediate regions, the terminals on the both upper and lower sides are joined with each other via welded parts, and therefore, the positive-electrode terminals and the negative-electrode terminals come into sufficiently close contact with each other. Accordingly, any gaps are hardly generated between the terminals, and thus, electric currents flow therethrough in a favorable manner.

Although WO2006/016441 does not discuss joint strength, an increase in the electric resistance and a decrease in the joint strength are caused from production of large amounts of intermetallic compounds. From the perspective of suppression of such production of intermetallic compounds, the direction of WO2006/016441 is the same as the direction of JP-A-2012-138306.

SUMMARY

However, when the conventional art disclosed in JP-A-2012-138306 is employed for welding an aluminum bus bar and a nickel-plated copper terminal, the following problems will arise.

In the welding method disclosed in JP-A-2012-138306, the first metal component and the second metal component are placed so as to butt with each other, a linear joint material is inserted into a gap that has been formed by a cut part, and then, the joint material, and parts of the first metal component and the second metal component are caused to melt so as to weld the first and second metal components.

When lap welding is carried out, at first, the first metal component is caused to melt, and then, the joint material and the second metal component are caused to successively melt based on extension of the welded part to the depth direction. Thus, a welded part of the second metal component becomes much smaller than that of the first metal component. Accordingly, it would be difficult to control the composition of the entire joint part so as to be a composition based on the joint material. An upper portion of the joint part will contain larger amounts of elements present in the first metal component, and a lower portion of the joint part will contain larger amounts of elements present in the second metal component. Thus, a structure in which the composition gradually varies in the depth direction will be provided.

Consequently, a region of solid solution in the depth direction will be narrower, larger amounts of intermetallic compounds that are formed by a direct reaction between Al and Cu will be present, and this will result in low joint strength.

Additionally, since a joint material is required, and an additional step for processing the first metal component or the second metal component in order to insert the joint material into their joint surface is also required, costs for preparing components for welding will be higher, and this impedes cost reductions.

Next, in the welding method disclosed in WO2006/016441, there are spot-like welded parts in the lapped area. In case of carrying out spot welding, the welding point is irradiated with a laser beam. The surface of the first metal plate is heated, and an area around the surface is caused to melt when the temperature is increased to or higher than the melting point. If the laser irradiation is further continued, the welded part extends to a deep position in the first metal plate, and the bottom of the first metal plate is eventually caused to melt. Subsequently, the upper surface of the second metal plate is melted, and the second metal plate is eventually melted to a target depth. Then, the laser irradiation is halted, and the welded part is caused to solidify, thereby completing the welding process. This step is repeated multiple times in the same manner by relatively moving the laser irradiation device or welding subjects to somewhere away from the welding point.

If such spot welding is carried out, since the time required for laser irradiation to one point is very long, the melt time becomes longer, elements in the first and second metal plates are mixed, and atoms are easily arrayed in an orderly fashion. Accordingly, large amounts of intermetallic compounds are produced in the joint part, and therefore, the joint strength is deteriorated. Thus, basic joint strength per unit area becomes low, and therefore, it is difficult to improve the joint strength to a large extent since large amounts of intermetallic compounds are produced, even if the joint area is increased by forming multiple joint parts. Additionally, in bus-bar welding in which small terminal parts are connected, it would be difficult to secure large welded areas.

Furthermore, although some of conventional arts, including the above patent literatures, describes compositions of joint parts, they do not describe in detail what locations of the joint parts are selected and how compositions of the selected locations are evaluated. Thus, in the current situation, any specific methods for evaluating welded parts in which intermetallic compounds and solid solutions coexist have not yet been established.

The disclosure is completed in consideration of the above-described problems, and, for welding two different metal materials, the purpose of the disclosure is to provide a welded metal component having a stable welded part with high weld strength, and a battery including the same.

In order to achieve the above-mentioned purpose, provided is a welded metal component, including: a first component; a second component that is stacked on the first component and that is made of a material different from the first component; and at least one welded part that passes through the second component so as to reach the first component, wherein a proportion of an intermetallic compound present in the at least one welded part is from 15% to 60%, and the intermetallic compound includes a metal element that constitutes the first component, and a metal element that constitutes the second component. Further provided is a battery comprising the above welded metal component, wherein the first component serves as a bus bar, and the second component serves as an electrode for the battery.

According to the disclosure, high-quality and high-speed welding can stably be realized for any welding points including inexpensive aluminum bus bars and cell terminals, for example, for the purpose of connecting multiple battery cells in battery systems. The same effects and advantages can be obtained also for welding processes relating to electric double layer capacitors and any other electric or electronic components. As a result, the disclosure makes it possible to produce higher-capacity and highly-reliable battery systems at low costs, and contributes to distributions of eco-friendly cars such as hybrid cars and electric vehicles.

DESCRIPTION OF EMBODIMENTS

Hereinafter, embodiments of the disclosure will be described with reference to the drawings. To simplify the description, components having a substantially identical function will be shown by the same reference symbol. Relationships among the first and second embodiments, examples corresponding to these embodiments, and comparative examples are summarized in FIG. 1. Each of the embodiments will be described below.

Data in rows referred to as "peeling strength" and data in rows referred to as "proportions of areas of intermetallic compounds" are correspondingly provided in order.

First Embodiment

Figure 2A:
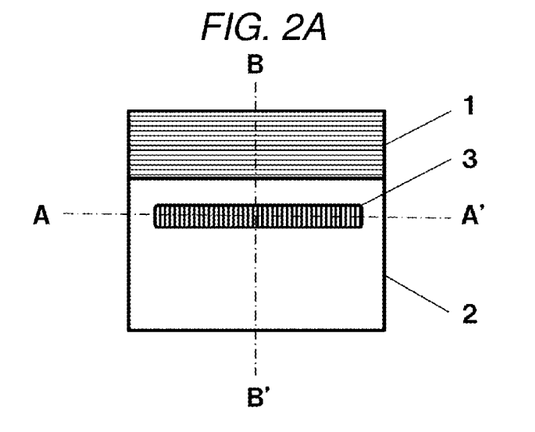
FIG. 2A is a top view of a welded part showing a welded structure according to a first embodiment.
Figure 2B:
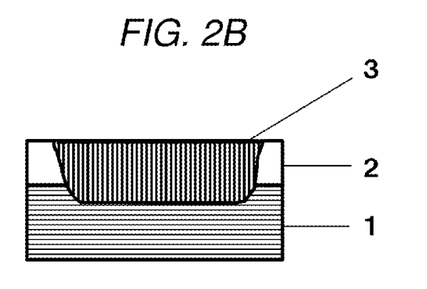
FIG. 2B is a cross-section view of the welded part in FIG. 2A.
Figure 2C:
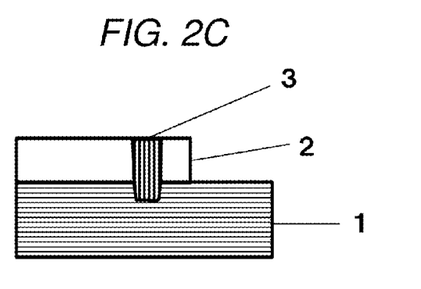
FIG. 2C is a cross-section view of the welded part in FIG. 2A.

FIGS. 2A to 2C shows a welded metal component according to the first embodiment, and the welded metal component includes: a first component 1; a second component 2 that is stacked on the first component 1, and that is made of a material different from that of the first component 1; and a welded part 3 that is located through the first component 1 and the second component 2. FIG. 2A is a top view of the second component 2 viewed from above, FIG. 2B is a cross-section view of the welded part along the line A-A', and FIG. 2C is a view that shows a cross-section structure of the welded part along the line B-B'.

For materials for the first component 1 and the second component 2, metal materials such as titanium, aluminum, nickel, copper, iron, and magnesium may be selected, and combinations of different materials are employed therefor. As one example, a case in which the first component 1 is made of copper, and the second component 2 is made of aluminum will be described below.

The second component 2 that is an aluminum plate is placed on the first component 1 that is a copper plate. In that case, although not shown in FIG. 2B, a gap between the second component 2 and the first component 1 is controlled to be as small as possible by use of a jig pressing a part of the surface of the second component 2 which is not irradiated with a laser beam, toward the direction from the upside to the downside of FIG. 2B.

Figure 3:
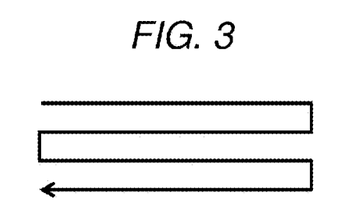
FIG. 3 is a diagram that schematically shows a trajectory along which a laser beam is shifted in the disclosure.

Then, while the position of the welded part 3 in FIG. 2A is gradually shifted to the vertical direction along the trajectory shown in FIG. 3, a laser beam is moved to the right and left directions several times. In that case, it is important to adjust the spot diameter of the laser beam to be small at the processing point, and to move the laser beam at high speed.

When the spot is small, a small area is locally melted by the laser beam, and this spot is shifted at high speed. Accordingly, the melt time at a given site becomes very short, and copper and aluminum are not sufficiently mixed. Therefore, growth of intermetallic compounds is suppressed, and thus, a large amount of solid solution remains in the welded part 3 shown in FIG. 2B.

Figure 2D:
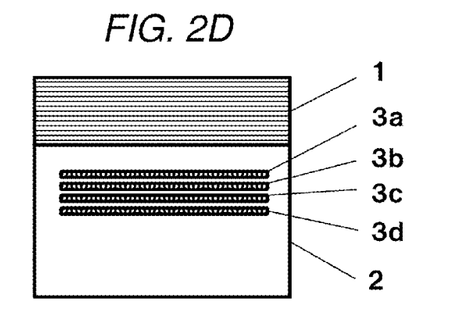
FIG. 2D is a plan view of the welded part in a comparative example.

Furthermore, at that time, it is preferable that the welded part 3 viewed from above in FIG. 2A does not come into a state shown in FIG. 2D. FIG. 2D corresponds to FIG. 2A, and depicts the welded part 3. In FIG. 2D, several laser-beam shifting sites that are slightly different from each other are provided, thereby forming separate welded parts 3a, 3b, 3c and 3d. Multiple separate welded parts arranged in such a way is not preferable, and, preferably, welded parts slightly overlap to provide one large welded part 3. Since a laser beam with a small spot diameter is shifted at high speed, a melting width formed by one shift is very small. When, in the structure shown in FIG. 2D, the first component 1 and the second component 2 are pulled away from one another, they will be detached from one another since the joint strength of the thin welded part 3d is low. In the same manner, the welded parts 3c, 3b and 3a also only possess low strength. As a result, the total tension strength over the welded parts 3a to 3d will be low.

On the other hand, when one welded part such as the welded part 3 shown in FIG. 2A is formed as a whole, high tension strength can be obtained in the same manner as a case in which a laser beam with a larger spot diameter is shifted.

<Analysis on Welded Part 3>

Next, the second component 2 detached from the first component 1 in the above way was placed such that the detached part was not touched and became flat. Then, the detached surface, i.e., the lower-surface side in FIG. 2B, was irradiated with electron beams from an electron gun, and emitted characteristic X-rays were detected by a detector. While the second component 2 was moved relatively to the electron beams, an elemental analysis was carried out with respect to several locations by an identification unit that identifies elements based on detected characteristic X-rays. Thus, an aluminum/copper elemental map of the detached surface of the welded part 3 of the second component 2 was computed and displayed on a computing display, as shown in FIGS. 4A and 4B.

Figure 4A:
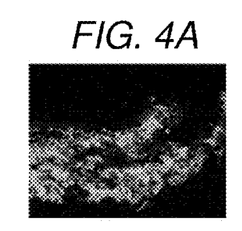
FIG. 4A is a diagram that shows an electron microscopic photo and an aluminum/copper elemental map of a fracture surface of a welded part according to the disclosure.
Figure 4B:
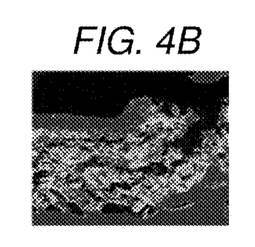
FIG. 4B is a diagram that shows an electron microscopic photo and an aluminum/copper elemental map of a fracture surface of a welded part according to the disclosure.

FIG. 4A shows an aluminum elemental map of the detached surface of the welded part 3, and FIG. 4B shows a copper elemental map of the detached surface of the welded part 3. In that case, a scanning electron microscopic (SEM) photo of FIG. 4C with respect to the detached surface of the welded part 3 was also taken at the same angle.

Figure 4C:
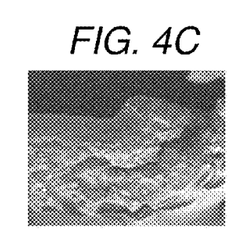
FIG. 4C is a diagram that shows an electron microscopic photo and an aluminum/copper elemental map of a fracture surface of a welded part according to the disclosure.

From the SEM photo of FIG. 4C, only the actual welded part was selected, and a welded area was calculated. Then, based on the aluminum/copper elemental maps shown in FIGS. 4A and 4B, three aluminum compositional domains were randomly selected, and images corresponding to these aluminum compositional domains were again computed in the computing display, provided that the total amount of aluminum and copper in each measured point was considered 100%. The results were displayed, on the computing display, as binarized maps corresponding to the respective compositional domains, as shown in FIGS. 5A to 5C.

Figure 5A:
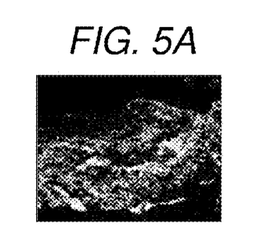
FIG. 5A is a diagram that shows an electron microscopic photo and an elemental map with respect to compositional domains of aluminum, with regard to a fracture surface of a welded part according to the disclosure.

FIG. 5A shows a map of an alloy having a composition in which a proportion of aluminum is from 0% to 25%. In the same manner, FIG. 5B shows a map of an alloy having a composition in which a proportion of aluminum is from 26% to 75%, and FIG. 5C shows a map of an alloy having a composition in which a proportion of aluminum is from 76% to 100%.

Figure 5B:
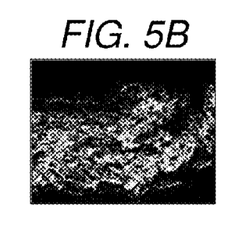
FIG. 5B is a diagram that shows an electron microscopic photo and an elemental map with respect to compositional domains of aluminum, with regard to a fracture surface of a welded part according to the disclosure.
Figure 5C:
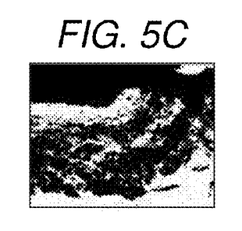
FIG. 5C is a diagram that shows an electron microscopic photo and an elemental map with respect to compositional domains of aluminum, with regard to a fracture surface of a welded part according to the disclosure.
Figure 5D:
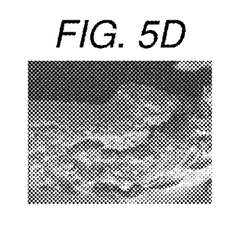
FIG. 5D is a diagram that shows an electron microscopic photo and an elemental map with respect to compositional domains of aluminum, with regard to a fracture surface of a welded part according to the disclosure.

In the computing unit, an area of an intermetallic-compound compositional domain, i.e., an area of parts in which an alloy is produced and that are shown in FIG. 5B (white parts in the figure), was calculated, and was divided by a welded area of the welded part selected from FIG. 4C to thereby calculate an area ratio (proportion) of intermetallic compounds. It can be deduced that this proportion serves as a mean proportion of intermetallic compounds in the welded part 3.

Figure 6:
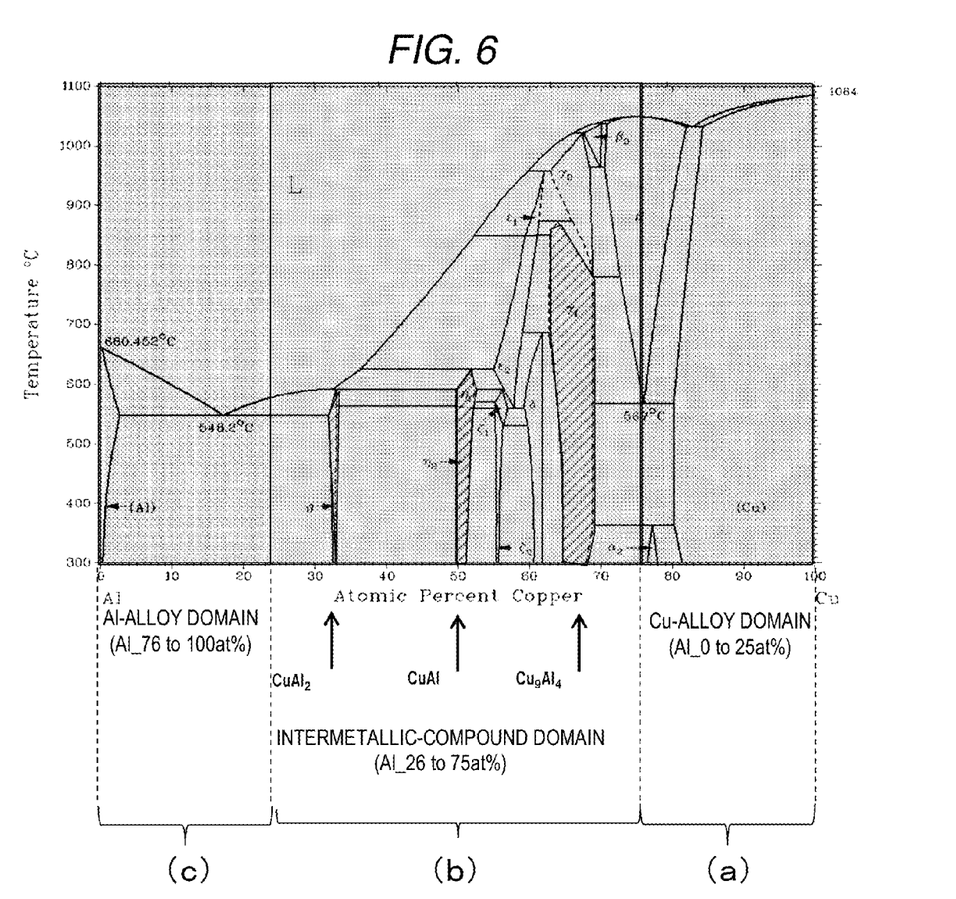
FIG. 6 is a state diagram of copper and aluminum.

A state diagram of aluminum and copper is shown in FIG. 6. From the right side, a composition domain with an aluminum proportion of 0% to 25% (Cu-alloy domain; FIGS. 4A and 5A), a composition domain with an aluminum proportion of 26% to 75% (intermetallic-compound domain; FIGS. 4B and 5B), and a composition domain with an aluminum proportion of 76% to 100% (Al-alloy domain; FIGS. 4C and 5C) are provided.

Within the intermetallic-compound domain with 26% to 75% of aluminum, main intermetallic compounds of $Cu_9Al_4$ (about 31%), CuAl (50%), and $CuAl_2$ (about 67%) exist.

Ingredients other than the intermetallic compounds are solid solutions of aluminum or copper. Portions having compositions similar to the composition of intermetallic compounds are actually mixture domains of intermetallic compounds and solid solutions, and contain large amounts of intermetallic compounds.

Therefore, a compositional domain that falls within the compositional region having 26% to 75% of aluminum and that has a composition outside $Cu_9Al_4$ and $CuAl_2$ was defined as a compositional domain of intermetallic compounds of aluminum and copper. That is, in FIG. 5B, an area ratio (proportion) of the compositional domain including 26% to 75% of aluminum to the welding area (i.e., an area ratio (proportion) of the white parts in the figure) was considered as an area ratio (proportion) of intermetallic compounds of aluminum and copper.

The portions having a composition similar to the above composition of intermetallic compounds, i.e., the part of the outside composition, falls within a range from ±10% to ±6% of the composition of intermetallic compounds at a maximum. In this case, 26% was adopted for $Cu_9Al_4$ (about 31%), and 75% was adopted for $CuAl_2$ (about 67%).

Since intermetallic compounds are hard and fragile, joint strength will be lower if large amounts thereof are produced in the welded part. By forming a joint part with a smaller level of intermetallic-compound production, it becomes able to provide a high-quality and low-cost welded metal component having high joint strength.

Although a welding process for heterogenous materials, i.e., aluminum and copper, is described in this embodiment, the same shall apply to a welding process for heterogeneous materials including as titanium, aluminum, nickel, copper, iron, and magnesium. However, rates of decreases in the joint strength when intermetallic compounds are produced will significantly vary with combinations of materials. In the welding process for heterogeneous materials of aluminum and copper described in this embodiment, effects to improve the joint strength based on suppression of production of intermetallic compounds are remarkable because originally-expected deteriorations in the joint strength due to production of intermetallic compounds are significant.

Furthermore, although copper is described as a material for the second component 2 in this embodiment, the same effects can be obtained even in cases where copper materials with nickel-plated surfaces are used. The same effects will be obtained in any other cases in which materials with plated surfaces are used for either/both of the first component 1 and the second component 2 (e.g., cases in which galvanized iron materials are employed therefor), regardless of types of plating materials, since amounts of atoms of plating materials are slight compared with amounts of metal atoms that generate intermetallic compounds.

Although a compositional domain with an aluminum proportion of 0% to 25% (Cu-alloy domain), a compositional domain with an aluminum proportion of 26% to 75% (intermetallic-compound domain), and a compositional domain with an aluminum proportion of 76% to 100% (Al-alloy domain) are adopted as settings of compositional domains, the settings are not limited to thereto as long as the intermetallic-compound domain includes $Cu_9Al_4$, $CuAl$ and $CuAl_2$.

Furthermore, although an elemental analysis was conducted with respect to the detached second component 2 in this embodiment, the same effects will be observed when an elemental analysis was conducted with respect to the detached first component 1 in the same manner.

Example 1

With regards to the first embodiment, specific examples and comparative examples will be described below.

In FIGS. 2A to 2C, a part of an aluminum plate that had a thickness of 0.5 mm and that served as the second component 2 was placed on a copper plate that had a thickness 2 mm and that served as the first component 1, and a jig (not shown in the figures) was pressed on the second component 2 from the upside to the downside, such that a gap between the first component 1 and the second component 2 was made as small as possible. In order to prevent electric corrosion between copper and aluminum, the surface of the first component 1, which was a copper plate, may be subjected to nickel-plating at a plating thickness of about 6 μm.

A laser beam that had been emitted from a fiber laser emitter at an output of 1200 W was delivered to the surface of the second component 2 by a condenser lens to be spot light with a spot diameter of 50 μm thereon, and the laser beam was shifted along a course 10 mm in length at a rate of 500 mm/s to the right direction in the figures.

Then, the laser beam was moved 0.1 mm away from the above course to the downside in the figure, and was moved to the direction opposite to the first moving direction. Thus, the laser beam was moved along the trajectory shown in FIG. 3 over the total of four courses, while being successively displaced 0.1 mm away from the previous course. In that case, in FIG. 2B, the first component 1 is immobilized, and the tension strength (detachment strength) of the second component 2 directed to the upward direction was measured. As a result, tension strengths for three samples that had been prepared in the same manner were 129 N, 154 N and 116 N, and thus, any of these samples realized high tension strengths that exceeded 100 N.

The minimum standard was 80 N or higher in the mean. In that case, its practical use becomes possible for batteries for vehicles. It would be tolerant to vibration or the like. The tension strength is preferably 100 N or higher, and is more preferably 120 N or higher. The above-mentioned standard was adopted as a criterion for the results shown in FIG. 1.

Then, aluminum/copper elemental analyses were carried out with respect to the detached surface of the second component 2 by use of an electron probe microanalyzer (EPMA) without touctablehing the detached part. Thus, aluminum/copper elemental maps as shown in FIGS. 4A and 3B were generated. Additionally, as shown in FIG. 4C, an SEM photo was taken at the same angle. Based on the SEM photo, a boundary of the welded part was traced to determine the welded region since the detached part (welded part) was indented, and thus, an area of the welded region was calculated.

On the aluminum/copper elemental maps in FIGS. 4A and 4B, correction was carried out for noise components such that the sum of contents of aluminum and copper in each point of the welded part 3 became 100%, and the aluminum elemental map was again computed within three ranges of the compositional domains of 0-25%, 26-75% and 76-100% to display binarized images for the respective domains.

As shown in FIGS. 5A to 5C, binarized elemental maps were generated. The 26-75% elemental map in FIG. 5B shows a distribution of intermetallic compounds in the joint part. Thus, it was revealed that the intermetallic compounds were scattered, and were uniformly (sparsely) distributed, over the entire region.

Sizes of agglomerations of intermetallic compounds in the welded part were less than or comparable to 400 μm.

Furthermore, the 0-25% elemental map of FIG. 5A represents a distribution of copper-rich solid solutions, and the solid solutions were distributed sparsely and uniformly over the entire region of the joint part in the same manner as the intermetallic compounds. On the other hand, the 76-100% elemental map of FIG. 5C represents a distribution of Al-rich solid solutions. It was revealed that there was a tendency that the Al-rich solid solutions were eccentrically and locally located, compared with the intermetallic compounds and the copper-rich solid solutions.

The total area of the intermetallic compounds, i.e., the white parts in the 26-75% elemental map in FIG. 5B, was calculated, and was divided by the welded area to obtain the area ratio (proportion). As a result, the area ratios for the three samples prepared in the same manner were 22%, 34% and 15%.

Comparative Example 1

In the same manner, tension strengths of samples that had been prepared at an output of 800 W were 63 N, 29 N and 38 N. Area ratios (proportions) of intermetallic compounds in joint parts of these samples were 12%, 8% and 11%, and intermetallic compounds were distributed not over the entire regions of the welded parts but in form of thin lines along trajectories on which laser beams were shifted.

Example 2

Furthermore, tension strengths of samples prepared at an output of 1800 W in the same manner were 142 N, 75 N and 108 N. Area ratios (proportions) of intermetallic compounds in joint parts of these samples were 45%, 71% and 60%, and intermetallic compounds were distributed sparsely (scattered) over the entire region.

Based on the above results, it was revealed that area ratios (proportions) of intermetallic compounds in welded parts 3 of the samples having relatively higher tension strengths, i.e., 80 N or more, fall within a range of 15% to 60%. In cases where laser beams were shifted at high moving speed of 500 mm/s, any significant deteriorations were not observed in the tension strength, and also, area ratios (proportions) of intermetallic compounds did not become large, even when outputs much higher than the standard output of 1200 W were adopted, although slightly large variations were observed.

Intermetallic compounds were distributed sparsely (scattered) over the entire region in the above cases. Therefore, it was considered as follows: metals were melted only for a short period of time even at high outputs because laser beams were moved at high speed, and therefore, metal atoms were sufficiently mixed with each other, and hardly came to arrangements of intermetallic compounds. Furthermore, intermetallic compounds were distributed sparsely (scattered) over the entire region. That is, large agglomerations of intermetallic compounds with extremely low strength did not exist, and there were no fragile parts that could be origins of detachment, over the entire regions of joint parts. Thus, it became possible to stably realize high strength.

On the other hand, samples that had been prepared at an output of 800 W exhibited very low tension strength. The reason for this is considered as follows. That is, since intermetallic compounds were distributed in form of thin lines on the trajectories along which the laser beams were shifted, only high-temperature center portions of spots were melted, and the entire surfaces of the second components 2 was melted. However, since the calculated actual joint areas were very small, the area ratios (proportions) of intermetallic compounds were also small. At an output of 800 W, a shortage of the melt volume (shortage of the joint area) due to a low output is a cause for the reduced strength, and it was revealed that, in cases where a low area ratio (proportion) is obtained, the joint strength will also be low.

In addition, although only examples of thicknesses of a copper plate and an aluminum plate, and a plating thickness are shown in this example, these thicknesses are not limited to the values shown in this example. Furthermore, conditions for laser outputs, welding rates, spot diameters, the number of laser-moving courses, laser-moving length, laser-moving-course intervals, etc. depend on the total thermal capacity including materials and surface states of metal components to be welded, thicknesses of plates, and the jig. Therefore, these parameters are not limited to the above-described conditions. For the laser-moving method, a method for moving an optical system itself, a method for moving a laser beam based on a galvanoscanner or the like, a method in which the work is moved, etc. can be used, and any methods that enable relative movement of the laser beam and the work can be used.

Furthermore, although a fiber laser was used as a laser emitter in this example, even by using any other laser emitters (e.g., a disk laser, a YAG laser, a $CO_2$ laser, and a semiconductor laser) that can provide high-output laser radiation, the same effects can be obtained. Additionally, by using electron beams other than laser as a heat source, the same effects can be obtained.

Comparative Example 2

A welding process was carried out in the same manner as EXAMPLE 1 except that the laser output and the laser-moving rate were changed.

While the laser output was set to 1200 W constantly, and the laser-moving rate was set to 300 mm/s, the welding process was carried out in the above way. As a result, tension strengths of the produced samples were 78 N, 56 N and 40 N. Area ratios (proportions) of intermetallic compounds in joint parts of these samples were 63%, 70% and 81%, and intermetallic compounds were distributed sparsely (scattered) over the entire region of the welded parts.

Comparative Example 3

A welding process was carried out in the above manner except that the laser-moving rate was set to 100 mm/s. As a result, tension strengths of the produced samples were 33 N, 52 N and 45 N. Area ratios (proportions) of intermetallic compounds in joint parts of these samples were 84%, 78% and 86%, and intermetallic compounds were distributed sparsely (scattered) over the entire region of the welded parts.

When the laser-moving rate was made slower, decreases in the tension strengths became significant, and area ratios (proportions) of intermetallic compounds became larger, compared with cases in which the output is made higher. The reason for this was considered as follows: the melting time became longer when the laser-moving rate became slower, and thus, metal atoms were sufficiently mixed, and easily came to arrangements of intermetallic compounds. As a result, large amounts of intermetallic compounds might be produced, and, consequently, tension strengths might be deteriorated.

In addition, a case where the output is 1200 W is described for this example, the same effects can be obtained even when any other outputs are adopted.

Example 3

A welding process was carried out in the same manner as EXAMPLE 1 except that the laser output and the laser-moving rate were changed.

In the laser-moving trajectory shown in FIG. 3, the laser beam was first moved along the first horizontal line (the top line in the figure) at an output of 1200 W and at 500 mm/s. Then, the laser beam was shifted 0.1 mm away from the first line in the vertical direction (shifted downward in the figure), and was further moved along the second horizontal line at an output of 1200 W and at 100 mm/s. Thus, these operations were performed as one set, and additional one set of operations was performed for the third and fourth lines in the same manner.

In this case, tension strengths of the produced samples were 133 N, 127 N and 107 N. Area ratios (proportions) of intermetallic compounds in joint parts of these samples were 43%, 56% and 60%, and intermetallic compounds were distributed sparsely (scattered) over the entire region of the welded parts.

Even when the laser beam was moved alternately at the fast rate and at the slow rate, intermetallic compounds were distributed sparsely (scattered) over the entire regions of welded parts, and high joint strength could be obtained. This is because, even if slightly large amounts of intermetallic compounds are produced when the laser beam is moved at a slow rate, intermetallic compounds are prevented from being produced continuously over the wide region of the welded part since the laser beam is moved at a fast rate along the next trajectory line.

In addition, although a case in which 1200 W is adopted for the output, and 500 mm/s and 100 mm/s are adopted for the laser moving rate is described for this example, the same effects can be obtained even when any other outputs and laser moving rates are adopted.

Comparative Example 4

A welding process was carried out in the same manner as EXAMPLE 1 except that the laser output, the laser-moving rate and the spot diameter were changed.

A fiber laser emitter with a larger fiber-core diameter was used, and was adjusted to emit a laser beam exhibiting a spot diameter of 200 μm at the processing point. In order to realize about the same melting depth as EXAMPLE 1, the welding process was conducted at an output of 3500 W and at a laser-moving rate of 100 mm/s in the same manner. In this case, tension strengths of the produced samples were 28 N, 36 N and 25 N. Area ratios (proportions) of intermetallic compounds in joint parts of these samples were 87%, 88% and 80%, and intermetallic compounds were distributed widely over the entire regions of the welded parts.

It is required that an amount of the energy incident on given points is increased by reducing the laser-moving rate, in order to obtain about the same penetration depth as that in EXAMPLE 1, because, when the spot diameter of the laser beam becomes larger, the power density becomes lower even if the output is increased. As a result, a spot with a large diameter and with a high output slowly passes through the part to be welded, and therefore, the melt time for the metal at given points becomes longer. Thus, large amounts of intermetallic compounds were produced over the entire regions of the joint parts. Consequently, area ratios (proportions) of intermetallic compounds in joint parts will be higher, and the tension strength will be deteriorated.

Therefore, in order to suppress production of intermetallic compounds, it is required that a laser beam with a small spot diameter is moved at high speed to thereby shorten the melting time for metals at given points, as demonstrated in EXAMPLE 1.

Comparative Example 5

A welding process was carried out in the same manner as EXAMPLE 3 except that, in the laser-moving trajectory shown in FIG. 3, the laser beam was moved at different rates for the first two horizontal lines (upside lines in the figure) and for the second two horizontal line (downside lines in the figure), respectively.

At first, the laser beam was moved on the first two horizontal lines at an output of 1200 W and at 500 mm/s. Then, the laser beam was moved on the rest of the two horizontal lines at an output of 1200 W and at 100 mm/s. In this case, tension strengths of the produced samples were 55 N, 83 N and 84 N. Area ratios (proportions) of intermetallic compounds in joint parts of these samples were 67%, 70% and 66%, and intermetallic compounds were distributed widely over the entire regions of the welded parts.

Figure 7:
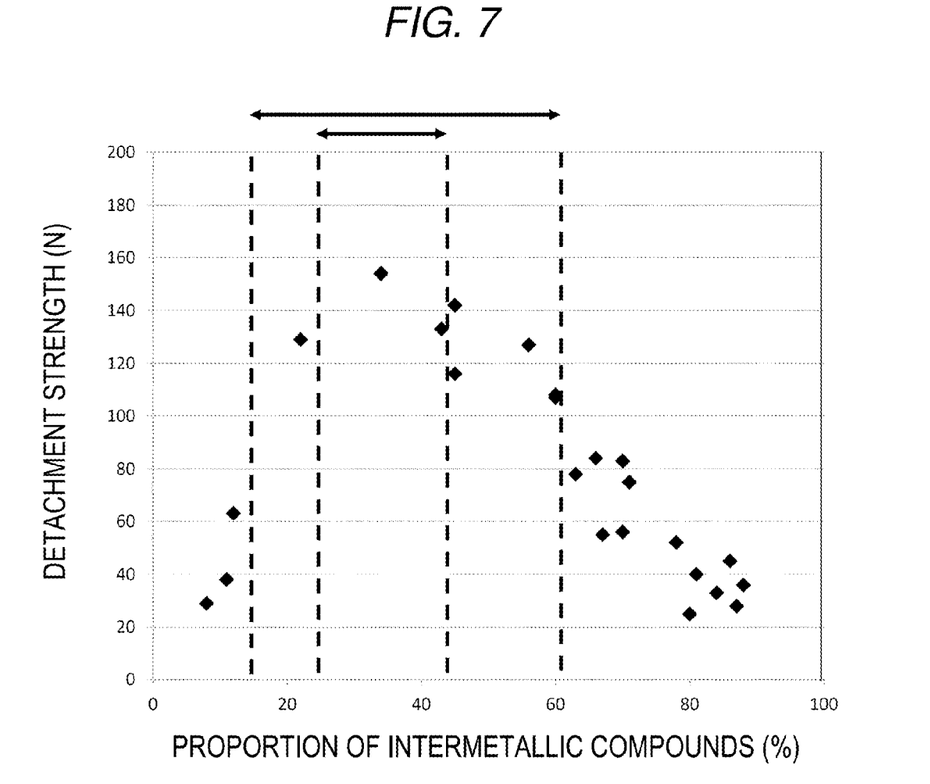
FIG. 7 is a graph in which area ratios (proportions) of intermetallic compounds are plotted versus tension strengths with respect to examples in the first embodiment and comparative examples.

Compared with EXAMPLE 3, there were tendencies that the area ratios (proportion) of intermetallic compounds were higher, and that the tension strengths are lower. Although similar laser-moving conditions as EXAMPLE 3 were adopted in this comparative example, intermetallic compounds were produced over almost entire regions of parts where the laser beam is moved at the slow rate, and thus, the joint strength is deteriorated, since the sequence of laser-beam moving rates are changed to conduct continuously operations at slow laser-moving rates at one time. Therefore, in cases in which a laser beam is moved at a fast rate and at a slow rate, the laser beam is preferably moved alternately at the fast rate and at the slow rate FIG. 7 shows a graph in which tension strengths are plotted versus area ratios (proportions) of intermetallic compounds with respect to samples according to EXAMPLES 1-3 in the first embodiment and COMPARATIVE EXAMPLES 1-5. When the area ratios (proportions) fall within a range from 15% to 60%, the tension strengths are high, i.e., 80 N or higher. Therefore, an area ratio (proportion) of intermetallic compound to the welded area in the fracture surface is preferably within a range from 15% to 60%. Furthermore, when the area ratio falls within a range from 25% to 45%, the detachment strength will be constant around 130 N, and therefore, such a range is more preferable.

Second Embodiment

Figure 8:
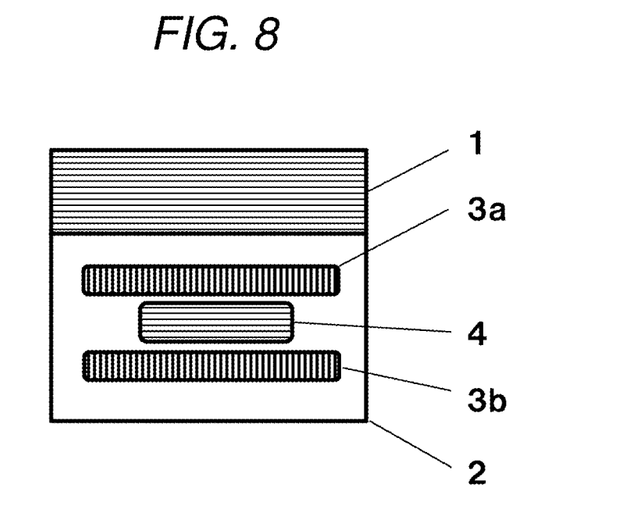
FIG. 8 is a top view of a welded part showing a welded structure according to a second embodiment.

FIG. 8 shows a welded metal component according to the second embodiment of the disclosure, and the welded metal component includes: a first component 1; a second component 2 that is made of a material different from that of the first component 1; and a welded part 3 that is located over the first component 1 and the second component 2. FIG. 8 is a top view of the welded metal component viewed from the direction above the first component 1. As shown in FIG. 8, a cut part 4 may be provided on the second component 2. Furthermore, a lug/projection may be provided inside the cut part 4 as a part of the first component 1 although it is not shown in the figure. Although the shape of the cut part 4 is rectangular with curved corners in the figure, any other shapes such as a circle can be adopted therefor.

The welding process is conducted with respect to the two sites, i.e., welded parts 3a and 3b shown in FIG. 8, by moving a laser beam on the surface of the second component 2. In each of the welded parts, the laser beam is shifted along four horizontal lines (four times) as shown in FIG. 3. By providing two welded parts, not only the tension strength is improved due to an enlarged welding area, but also the strength will significantly be stabilized. The reason for this is explained as follows. That is, in order to evaluate the detachment strength, at first, stress is applied to the linear part at the upper edge of the welded part 3a in FIG. 8. However, after the welded part 3a is detached from the welded metal component, the stress can again be received by the linear part at the upper edge of the welded part 3b, and variations in the stress can be absorbed by them. Furthermore, the upper edge of each of the welded parts is arranged as linear by moving a laser beam in the linear manner as shown in FIG. 3. Accordingly, the stress applied to the welded part 3b can dispersed based on lengths of the lines, and therefore, high joint strength can be obtained. In addition, the linear parts refer to linear shapes in plan view when the second component 2 was viewed from above.

Example 4

A welding process was carried out at an output of 1200 W and at a laser-moving rate of 500 mm/s in the same manner as Example 1 except that two welded parts 3a and 3b are provided as shown in FIG. 8. In each of the welded parts 3a and 3b, the laser beam was moved along four lines (four times) in the longitudinal direction (horizontal direction) as shown in FIG. 3.

In this case, tension strengths of produced samples were 173 N, 182 N and 184 N. Area ratios (proportions) of intermetallic compounds in joint parts of these samples were 22%, 40% and 20%, and intermetallic compounds were distributed sparsely (scattered) over the entire regions of welded parts. Tension strengths of samples that were produced at an output of 800 W in the same manner were 133 N, 124 N and 111 N. Area ratios (proportions) of intermetallic compounds in joint parts of these samples were 15%, 19% and 14%, and intermetallic compounds were distributed not over the entire regions of welded parts but in thin linear forms that corresponded to the trajectory on which the laser beam was moved. Furthermore, tension strengths of samples that were produced at an output of 1800 W in the same manner were 166 N, 135 N and 148 N. Area ratios (proportions) of intermetallic compounds in joint parts of these samples were 38%, 46% and 48%, and intermetallic compounds were distributed sparsely (scattered) over the entire regions of the welded parts.

In this way, by providing two welded parts, a welded metal component having high tension strength can be realized. Although a case in which two welded parts is provided is described in this example, high tension strength can stably be realized even by providing three or more welded parts.

In addition, although the laser-moving rate was 500 mm/s in this example, the same effects would be obtained even when any other laser-moving rates are adopted.

Example 5

Figure 9:
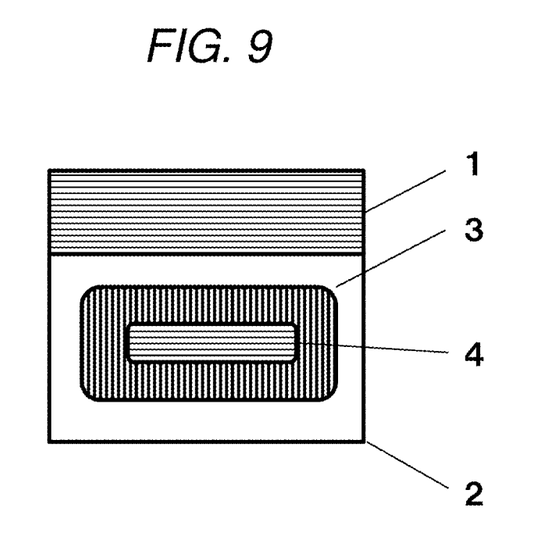
FIG. 9 is a top view of a welded part showing a welded structure according to EXAMPLE 5.

A welding process is carried out by setting the laser output and the laser-moving rate to 1200 W and 500 mm/s, respectively, in the same manner as EXAMPLE 4 except that the welded part 3 is formed in a circuit shape in plan view, as shown in FIG. 9, when the second component 2 is viewed from above.

With regard to the laser trajectory, the laser beam was moved along the outer periphery of the cut part 4. After this lap, the laser beam is moved 0.1 mm away from the previous trajectory to the outer direction, and then, the laser beam is moved along a trajectory with the same shape as the previous trajectory but 0.1 mm away from the previous trajectory to the outer direction. This operation was repeated four times.

In this case, tension strengths of produced samples were 195 N, 188 N and 180 N. Area ratios (proportions) of intermetallic compounds in joint parts of these samples were 34%, 29% and 30%, and intermetallic compounds were distributed sparsely (scattered) over the entire regions of welded parts. Tension strengths of samples that were produced at an output of 800 W in the same manner were 130 N, 108 N and 115 N. Area ratios (proportions) of intermetallic compounds in joint parts of these samples were 24%, 18% and 16%, and intermetallic compounds were distributed not over the entire regions of welded parts but in thin linear forms that corresponded to the trajectory on which the laser beam was moved.

Example 6

Furthermore, tension strengths of samples that were produced at an output of 1800 W in the same manner were 122 N, 133 N and 126 N. Area ratios (proportions) of intermetallic compounds in joint parts of these samples were 52%, 48% and 57%, and intermetallic compounds were distributed sparsely (scattered) over the entire regions of the welded parts.

In this way, by providing a welded part in a ring form (circular form), a welded metal component having high tension strength can be realized. Although the disclosure particularly focuses on tension strength in the detachment direction, stress can be dispersed against tension from all directions, and therefore, high joint strength can stably be realized, when the welded part is provided in form of a ring.

In addition, although the laser-moving rate was 500 mm/s in this example, the same effects would be obtained even when any other laser-moving rates are adopted.

Example 7

A welding process was carried out in the same manner as EXAMPLE 1 except that, for the laser trajectory on the welded part 3 in FIG. 2A, the number of laser-moving operations in linear parts shown in FIG. 3 was 8, and that the area of the welded part is equal to the sum of the areas of the welded parts 3a and 3b in EXAMPLE 4 in FIG. 8.

In this case, tension strengths of produced samples were 152 N, 137 N and 152 N. Area ratios (proportions) of intermetallic compounds in joint parts of these samples were 25%, 24% and 21%, and intermetallic compounds were distributed sparsely (scattered) over the entire regions of welded parts.

Example 8

Furthermore, tension strengths of samples that were produced at an output of 1800 W in the same manner were 153 N, 137 N and 128 N. Area ratios (proportions) of intermetallic compounds in joint parts of these samples were 45%, 63% and 60%, and intermetallic compounds were distributed sparsely (scattered) over the entire regions of the welded parts.

(Comparison and Summary)

Thus, as compared with EXAMPLE 4, even if areas of welded parts are the same, it is preferable that multiple welded parts are provided, since the number of sites where stress generated under load can be dispersed is increased. However, the same shall not apply to cases where a width of each of the welding spots is small as shown in FIG. 2D, and tension strength of each of the site is extremely low. In such cases, it would be critical to increase an area of each of the welding spots (welding width).

Figure 10:
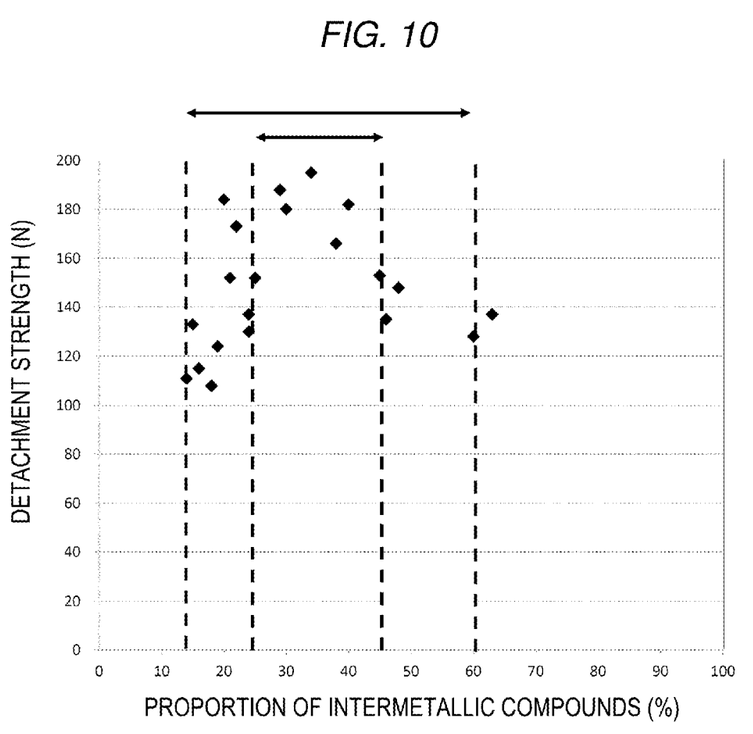
FIG. 10 is a graph in which area ratios (proportions) of intermetallic compounds are plotted versus tension strengths with respect to examples in the second embodiment and comparative examples.

FIG. 10 shows a graph in which area ratios (proportions) of intermetallic compounds are plotted versus tension strengths with respect to samples according to EXAMPLES 4 and 5 in this embodiment, and COMPARATIVE EXAMPLE 3. When the area ratios (proportions) fall within a range from 25% to 45%, the tension strengths are very high, i.e., 150 N or higher. Therefore, an area ratio (proportion) of intermetallic compounds to a welding area is more preferably within a range from 25% to 45%. In addition, this range exhibits more critical detachment strength, compared with other domains.

Figure 1:
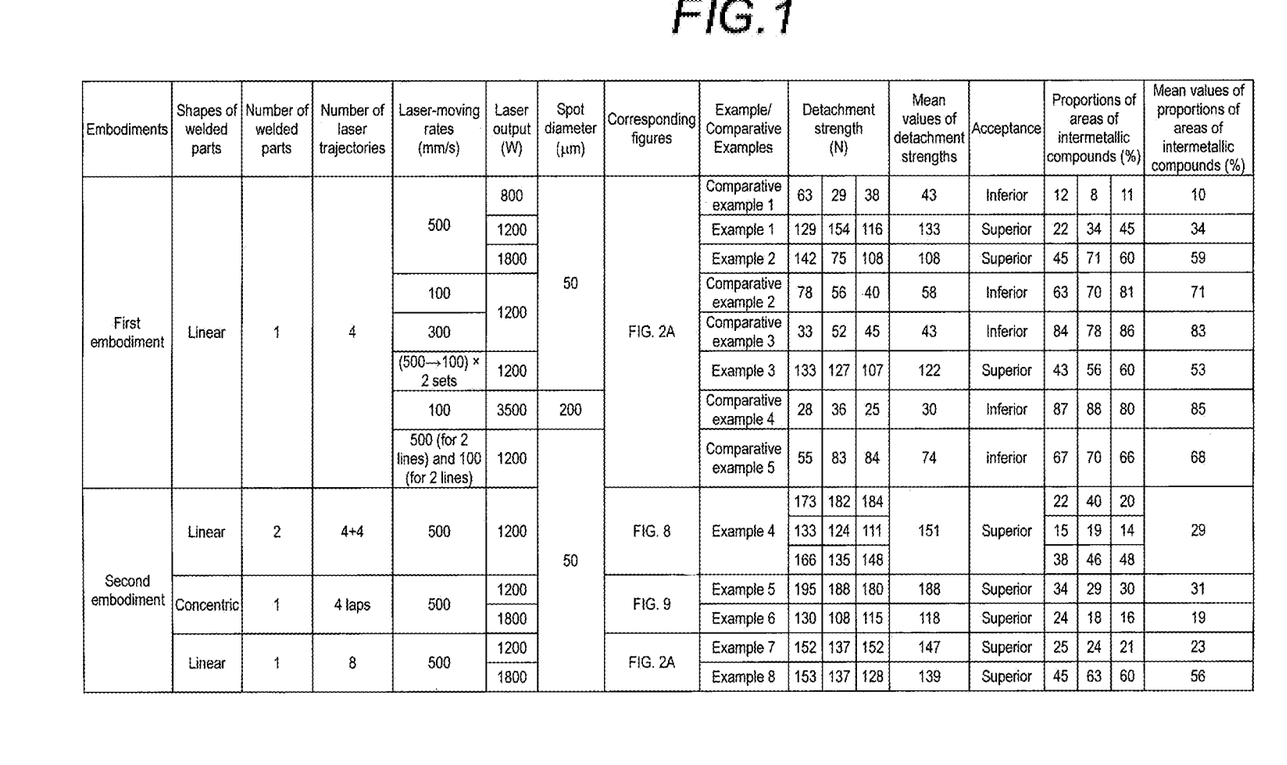
FIG. 1 summarized relationships among the first and second embodiments, examples corresponding to these embodiments, and comparative examples.

Additionally, when the area ratios fall within a range from 15% to 60%, the tension strength is 80 N or higher, and therefore, such a range is favorable. Furthermore, as shown in FIG. 1, it would be sufficient that a mean of the area ratios would be at least within a range from 15% to 60%. The mean of the area ratios is more preferably within a range from 25% to 45%.

Thus, welded metal components produced by welding heterogeneous metal materials stably exhibit high joint strength as long as area ratios (proportions) of intermetallic compounds to welding areas in the welded metal components fall within a range from 15% to 60%, preferably from 25% to 45%. Accordingly, it becomes possible to provide batteries and battery systems at low costs. Furthermore, these batteries and battery systems can be employed for vehicle batteries or stationary power-storage systems that are required to secure high outputs.

Application Examples

Figure 11:
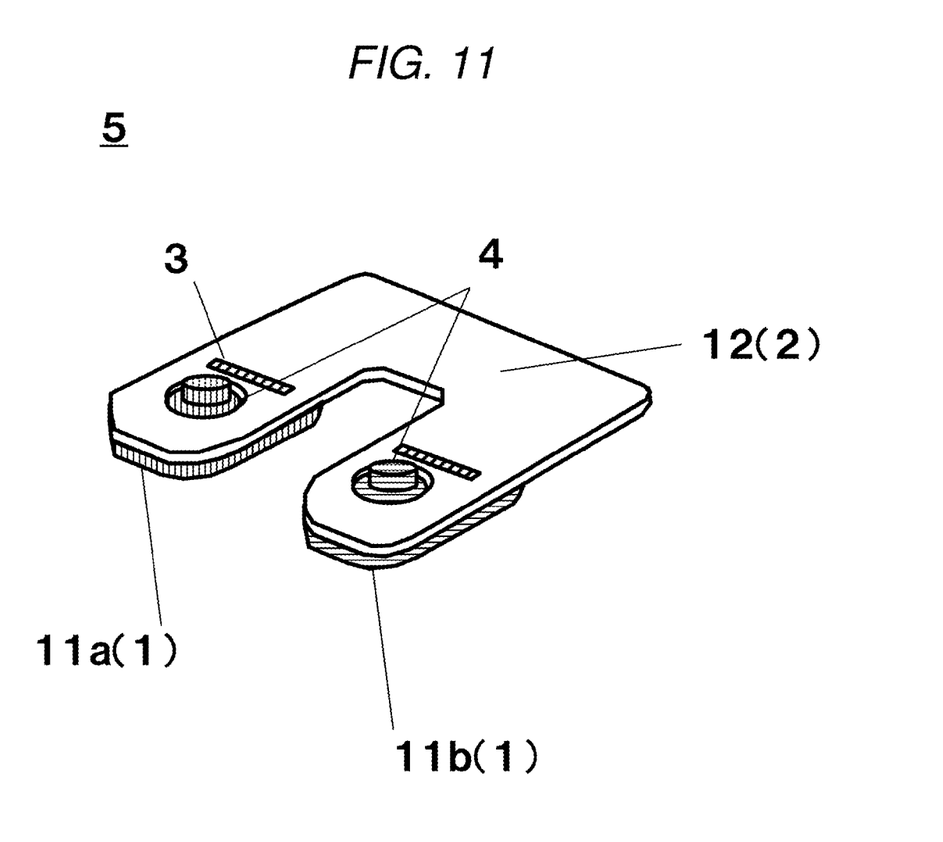
FIG. 11 is a perspective view of a battery in which a welded part of an embodiment is employed.

FIG. 11 is a perspective view of electrode parts of a battery 5.

An example in which the above-described embodiments are applicable to a battery 5 is shown. A positive electrode 11a and a negative electrode 11b of the battery are connected together via a bus bar 12.

The positive electrode 11a and a negative electrode 11b of the battery correspond to the first component 1 in the above embodiments. The bus bar 12 corresponds to the second component 2 in the above embodiments.

For the connection of these components, the first component 1 and the second component 2 are connected via a welded part 3 as described in the above embodiments. For the welded part 3, any one of the above embodiments may be used.

In FIG. 11, only one pair of the components is provided. However, multiple pairs of the components could be connected in series or in parallel for vehicle batteries.

For practical purposes, a lineup of batteries in which 5 to 30 pairs of the units are connected in series depending on models of vehicles have been provided. In addition, in some of commodities, they are connected in parallel.

(Overview)

In a battery, the first component 1 serves as an electrode in the battery body, and the second component 2 serves as a bus bar. A battery in which multiple electrodes are connected via one bus bar will be provided.

The above-described embodiments, and examples can be combined.

According to the disclosure, it becomes possible to weld heterogeneous materials, such as a combination of an aluminum material and a nickel-plated copper material, at high-quality and at low costs. Accordingly, battery systems can be provided at low costs. Furthermore, the disclosure can be employed for provision of vehicle batteries and stationary electricity storage systems that are required to secure high outputs.

Although cases of copper and aluminum is described herein, the same shall apply to other combinations of metal elements.

According to the disclosure, welded components with high joint strength can be provided for connection and immobilization of capacitors, and any other electric or electronic components, besides batteries and battery systems.

What is claimed is:

1. A welded metal component, comprising:
a first component;
a second component that is stacked on the first component and that is made of a material different from the first component; and
at least one welded part that passes through the second component to reach the first component, wherein
a proportion of an intermetallic compound present in the at least one welded part is from 15% to 60%, and the intermetallic compound includes a metal element that constitutes the first component, and a metal element that constitutes the second component,
the first component is made of copper, and the second component is made of aluminum, and
the intermetallic compound includes an aluminum proportion of 26% to 75%.

2. The welded metal component according to claim 1, wherein the proportion of the intermetallic compound is from 25% to 45%.

3. The welded metal component according to claim 1, wherein the intermetallic compound is scattered over the at least one welded part.

4. The welded metal component according to claim 1, wherein the proportion of the intermetallic compound is a proportion of an area of a compositional region, including the intermetallic compound, to an area of the at least one welded part.

5. The welded metal component according to claim 1, wherein the at least one welded part on a surface of the second component is ring-shaped in plan view.

6. The welded metal component according to claim 1, wherein the at least one welded part includes at least two welded parts each including a linear part in plan view.

7. The welded metal component according to claim 1, wherein those having an intermetallic-compound composition falling within a range from ±10% to ±6% of the compositional proportion of the intermetallic compound is regarded as the intermetallic compound.

8. A battery comprising the welded metal component according to claim 1, wherein the second component serves as a bus bar, and the first component serves as an electrode for the battery.

9. The welded metal component according to claim 3, wherein the intermetallic compounds are scattered and are uniformly distributed, and the sizes of one welded part are less than or comparable to 400 μm.

* * * * *